United States Patent [19]

Foglar et al.

[11] Patent Number: 5,222,063
[45] Date of Patent: Jun. 22, 1993

[54] METHOD AND CIRCUIT ARRANGEMENT FOR REDUCING THE LOSS OF MESSAGE PACKETS THAT ARE TRANSMITTED VIA A PACKET SWITCHING EQUIPMENT

[75] Inventors: Andreas Foglar; Peter Rau, both of Munich, Fed. Rep. of Germany

[73] Assignee: Siemens Aktiengesellschaft, Munich, Fed. Rep. of Germany

[21] Appl. No.: 678,046

[22] Filed: Apr. 1, 1991

[30] Foreign Application Priority Data

Apr. 27, 1990 [EP] European Pat. Off. ......... 90108054.9

[51] Int. Cl.⁵ .......................... H04Q 11/04; H04J 3/24
[52] U.S. Cl. ..................................... 370/60; 370/94.1
[58] Field of Search ..................... 370/94.1, 60, 16, 63; 340/825.8

[56] References Cited

U.S. PATENT DOCUMENTS

| | | | |
|---|---|---|---|
| 4,536,870 | 8/1985 | Bovo et al. | 370/16 |
| 4,837,761 | 6/1989 | Isono et al. | 370/60 |
| 4,870,639 | 9/1989 | Hayashi et al. | 370/60 |
| 4,879,712 | 11/1989 | Littlewood | 370/60 |
| 4,901,309 | 2/1990 | Turner | 340/825.8 |
| 4,991,168 | 2/1991 | Richards | 340/825.8 |

FOREIGN PATENT DOCUMENTS 0321050 6/1989 European Pat. Off. .
0384936 5/1990 European Pat. Off. .

OTHER PUBLICATIONS

Newman P., "A Broad-Band Packet Switch for Multi-Service Communications," IEEE Infocom '88, pp. 1A3.1–1A3.10.
"Mit ATM zur bitratenvariablen Kommunikation", Telcom Report, vol. 13, No. 1, Jan./Feb. 1990, pp. 4–7, by Herbert Schneider.

Primary Examiner—Douglas W. Olms
Assistant Examiner—Ajit Patel
Attorney, Agent, or Firm—Hill, Steadman & Simpson

[57] ABSTRACT

For reducing the loss of message packets that are transmitted according to an asynchronous transfer mode during the course of virtual connections and which comprise a packet header identifying the respective virtual connection and that are respectively augmented by a sequential auxiliary identifier and that, after multiplication, or transmitted separately via redundant switching matrices of a packet switching equipment, message packets that follow a respective faulty-transmitted message packet are intermediately stored, and that, following the transmission of an error-free message packet which corresponds to the respective faulty-transmitted message packet via a switching matrix that respectively transmits more slowly, the intermediately-stored message packets are forwarded in rapid succession.

4 Claims, 1 Drawing Sheet

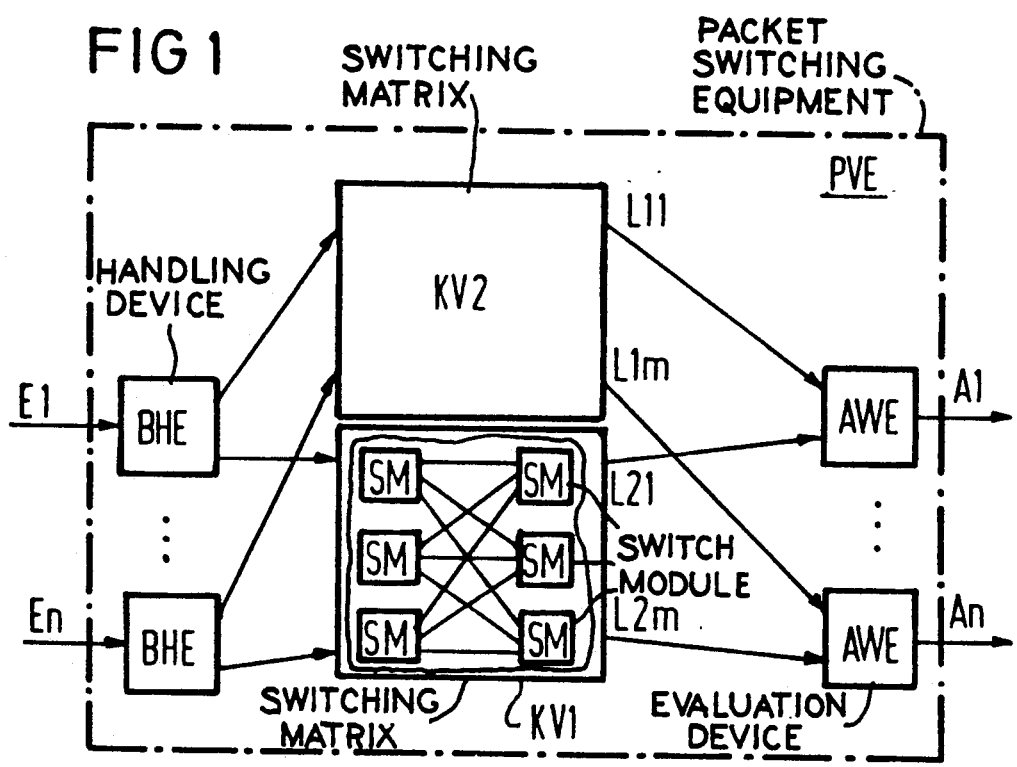
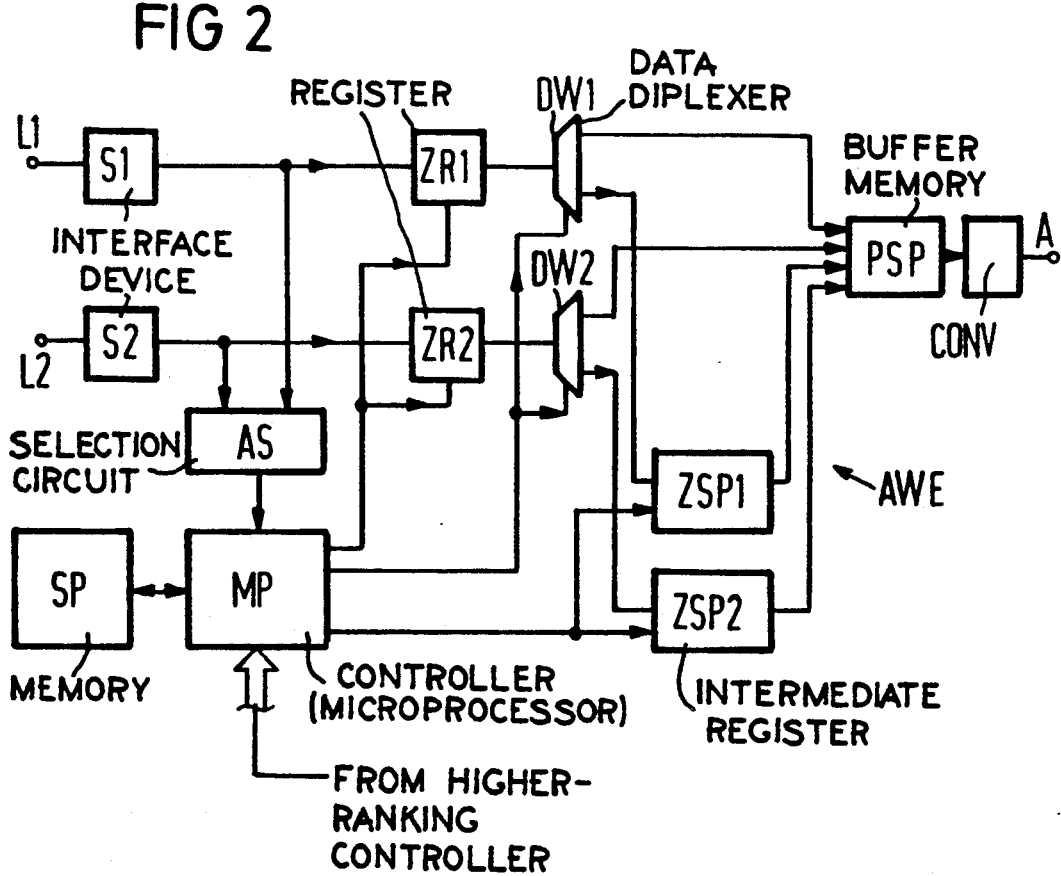

METHOD AND CIRCUIT ARRANGEMENT FOR REDUCING THE LOSS OF MESSAGE PACKETS THAT ARE TRANSMITTED VIA A PACKET SWITCHING EQUIPMENT

BACKGROUND OF THE INVENTION

Field of the Invention

The present invention relates to a method and a circuit arrangement for transmitting cells, that are referred to below as message packets, and is more particularly concerned with reducing the loss of transmitted message packets which are transmitted in accordance with an asynchronous transfer mode for message packets on offering lines during the course of virtual connections.

More specifically, the present invention relates to a method into a circuit arrangement for forwarding message packets that are transmitted according to an asynchronous transfer mode on offering lines during the course of virtual connections and comprise a packet header which identifies the respective virtual connection to the serving lines via a packet switching equipment that comprises at least two redundant switching matrices, the serving lines being connected to the packet switching equipment, whereby a message packet group having a plurality of identical message packets comprising to the number of redundant switching matrices is formed by a multiplication for each of the message packets transmitted on one of the offering lines during the course of a virtual connection. An identical auxiliary identifier that changes for successive message packet groups is attached to each of the message packets on the message packet group and the message packets of the message packet group are separately transmitted via the redundant switching matrices towards the serving line coming into consideration for the respective virtual connection. After such a transmission via the redundant switching matrices on the basis of the auxiliary identifier respectively attached to the message packets, only one of the message packets belonging to a message packet group is forwarded to an allocated serving line.

Such a method and such a circuit arrangement have been disclosed, in general, in the European patent application 89103798.8.

In this method or in this circuit arrangement, a loss of an entire message packet cycle that can cover, for example, a plurality of 64 message packets can occur given a faulty transmission of a message packet.

SUMMARY OF THE INVENTION

The object of the present invention, therefore, is to provide a method and a circuit arrangement of the type generally set forth above that reduces the possible loss of message packets.

In a method of a type generally set forth above, the aforementioned object is achieved, according to the present invention, in that the first message packet of a message packet group is transmitted without error is respectively forwarded, and in that the message packets transmitted without error that follow a faulty-transmitted message packet are intermediately stored until a message packet that is transmitted without error by a respective slower switching matrix and that belongs to the same message packet group as the faulty-transmitted message packet has been forwarded, whereupon the immediately-stored message packets are forwarded in rapid succession.

This method yields the advantage that, after waiting for a message packet from a respective slower switching matrix, the absence of a following message packet need not lead to the loss of at least this message packet, even though it was already transmitted via a respective faster switching matrix. In this method, transmission is carried out via the switching matrix that respectively transmits the fastest, so that the jitter, on the one hand, and, on the other hand, the transit time in the switching equipment are minimized. This method allows a reduction in the loss of message packets by 3-5 orders of magnitude to be anticipated in comparison to the general method set forth above.

According to a further development and feature of the invention, a defined plurality of successive message packets form a message packet cycle and each intermediately-stored message packet is forwarded no later than following a time interval that corresponds to the minimum transmission duration of a message packet cycle.

This measure yields the advantage that ambiguities between message packets having the respective same auxiliary identifier in respective successive message packet cycles are avoided.

A circuit arrangement for implementing the method of the present invention comprises a handling device for each offering line and an evaluation device for each serving line, whereby the circuit arrangement, according to the present invention, is characterized in that the respective evaluation device forwards message packets that are transmitted without error as the respective first of their message packet group and in that message packets that follow one another after a faulty transmission of message packet are deposited in an intermediate memory, and in that a message packet transmitted by a respective slower switching matrix that belongs to the same message packet group as the faulty-transmitted message packet is forwarded onto the respective serving line, and in that the message packet deposited in the intermediate memory is forwarded onto the respective serving line in the same sequence in which it is deposited in the intermediate memory.

This circuit arrangement yields the advantage of a low circuit-oriented expense for the forwarding of message packets via the redundantly-designed packet switching equipment.

In a further development and according to a further feature of the circuit arrangement of the invention, a plurality of successive message packets form a message packet cycle and each intermediately-stored message packet is read from the memory and forwarded no later than following a time interval that corresponds to the minimum cycle duration of a message packet cycle.

Such a circuit arrangement yields the advantage that ambiguities between message packets having the respective same auxiliary identifier that belong to respective successive message packet cycles are avoided.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 1 is a block circuit diagram of a packet switching equipment constructed and operated in accordance with the present invention; and FIG. 2 is a schematic representation of a possible structure of an evaluation unit in which the method of the present invention is realized.

DESCRIPTION OF THE PREFERRED EMBODIMENTS

FIG. 1 schematically illustrates a packet switching equipment PVE to which a plurality of offering lines E1–En, as well as a plurality of serving lines A1–An, are connected. Of these offering and serving lines, only the offering lines E1 and En and the serving lines A1 and An are illustrated in FIG. 1. A respective transmission of message packets during the course of virtual connections according to asynchronous transfer mode occurs on the offering lines and the serving lines. It is assumed that the message packets are a matter of packets having a fixed length that respectively have a packet header with a respective virtual channel number, as well as an information portion. The respective virtual channel number, here referenced VCI, determines that serving line A coming into consideration to which the respective message packet is transmitted in accordance with the virtual connection. The transmission of the actual message signals occurs in the information portion. What are thereby to be understood by message signals are data signals and text signals, as well as voice signals or, respectively, image signals in digital form. It can also be provided that a respective check information is attached to the message packets, this being formed with the preceding signal status sequence of the respective message packet.

As can be seen from FIG. 1, a handling device BHE is allocated to each of the offering lines E1–En. The handling device BHE that, for example, can be represented by a handling device disclosed in the European Patent Application 89103798.8, attaches an auxiliary identifier to the message packets transmitted via the respective offering line E and belonging to a virtual connection, this auxiliary identifier respectively changing for successive message packets of the respective virtual connection. The auxiliary identifier is composed of a sequence number that is individually set to a defined initial value for each virtual connection during the course of the call set up and that is incremented for each successive message packet.

A plurality of, for example, 64 successive message packets can form a message packet cycle. The sequence number can then preferably assume a number of states that corresponds to the plurality of message packets covered by a message packet cycle. The handling device BHE forms two identical message packets, that are referred to below, in this particular environment, as message packet groups, from the message packets supplemented by the auxiliary identifier and feeds these to two redundant switching matrices KV1 and KV2 of the packet switching equipment PVE. It is indicated schematically in FIG. 1 with reference to the switching matrix KV1, that the two switching matrices KV can each respectively comprise a plurality of switch modules SM connected to one another. Since the structure and the operation of such switching matrices KV are already well known in the art, the same shall not be discussed in greater detail below.

Each of the switching matrices KV comprises a plurality of output lines L11–L1m, L21–L2m. Respectively, one output line L1 of the switching matrix KV1 and one output line L2 of the switching matrix KV2 are thereby connected in common to a separate evaluation means AWE. These evaluation devices AWE are each connected to a respective one of the serving lines A1–An. Such an evaluation device AWE accepts the message packets transmitted via the two switching matrices KV and, on the basis of an evaluation of the auxiliary identifier respectively attached to the message packets, that, as shall be set forth below in greater detail, outputs only one of the message packets belonging to a message packet group to the allocated serving line A.

It should also here be printed out with respect to the message packet switching equipment PVE that has just been set forth that the switching equipment PVE, in fact, comprises two redundant switching matrices according to FIG. 1. The number of redundant switching matrices, however, can also be correspondingly increased, dependent on the outage probability of each of the switching matrices KV, and on the required values for the availability of the packet switching equipment PVE.

FIG. 2 illustrates a possible structure of the evaluation device AWE shown in FIG. 1. The message packets of a message packet group transmitted via the respective output lines L1, L2 first each respectively pass through an interface device, here referenced S1 and S2. The recognition of the beginning of a message packet and the synchronization of received message packets with the system clock, with which the evaluation devices AWE are driven, respectively, occur in the interface device. A check of the transmitted message packets in view of an error-free transmission also respectively occurs in these interface devices, whereby a check, with reference to a check information, can be added thereto when such a check information is respectively attached to the message packets. When such an error-free transmission is present, the message packet just checked by the interface device S1 is supplied to an intermediate registered ZR1. Given an error-free transmission, the interface device S2 correspondingly conducts the message packet just checked to an intermediate register ZR2. The packet header of each message packet transmitted without error is additionally supplied to a selection circuit AS. This packet header comprises a channel number VCI belonging to the respective virtual connection and a sequence number continuously assigned by the handling device BHE at the input side of the packet switching equipment PVE. The selection circuit AS supplies the respective packet header to a control device MP that, for example, can be formed with a microprocessor and that, as indicated by a broken arrow, is connected to a higher-ranking control (not illustrated) of the packet switching equipment PVE. The virtual channel number VCI contained in the respective packet header is supplied to a memory SP and there serves the purpose of addressing a plurality of memory locations wherein, among other things, the call-associated sequence number that is set to a defined initial value during the course of setting up the respective virtual connection is deposited. The memory content of the respectively-addressed memory locations is transferred into the control device MP is the sequence number of the message packet being currently processed is compared to the respective sequence number from the call-associated memory locations.

When the control device MP determines that the respective sequence numbers supplied from the selection circuit AS is the next sequence number following the message packet most recently-forwarded, then the control device MP causes the forwarding of the respective message packet from the appertaining intermediate register ZR1, ZR2 via a respective data diplexer DW1, DW2 into a buffer memory PSP, effecting this on the basis of an auxiliary information carried along with the packet header from the selection circuit AS that indicates the switching matrix KV by which the respective message packet was transmitted.

When the control device MP identifies that the message packet just being processed has a sequence number for which a message packet was already forwarded from an intermediate register ZR1, ZR2 within an message packet cycle, then this message packet is considered to be a copy of a message packed already forwarded and it is not forwarded out of the intermediate register ZR1, ZR2, whereby it is overwritten by a respective following message packet. When, by contrast, the control device MP determines that the respective sequence numbers supplied by the evaluation circuit AS is a sequence number following the next-successive sequence number, then the control device MP effects that the message packet just being processed is taken from the respective intermediate register ZR1, ZR2 and stored in an intermediate memory ZSP1, ZSP2 by way of the appertaining data diplexer DW1, DW2. The control device MP thereby effects the storing of the sequence number of the respective message packet for the respective virtual connection in the memory SP.

The sequence number corresponding to the respectively-transmitted message packet is deposited in the call-associated memory locations in the memory SP for each message packet forwarded from the intermediate register ZR. With the virtual channel number VCI as an address, the respective sequence number can thereby be incremented, as a result whereof the identification of the respective, next-following message packet is limited to a comparison of the respective sequence numbers. In this procedure, a message packet is the next message packet following the most recently-forwarded message packet when a comparison of the sequence number carried by the message packet just transmitted to the sequence number that was most recently-deposited into the memory SP for the respective virtual connections yields coincidence.

When the respective, message packet is transmitted, without error, by a respective slower switching matrix KV, then this message packet is forwarded directly to a buffer memory PSP via the respective data diplexer DW1, DW2 and the intermediately-stored message packets belonging to the respective virtual connection are forwarded in rapid sequence to the buffer memory PSP, beginning with the message packet that has resided the longest in the respective intermediate memory ZSP1, ZSP2.

In the sequence in which they were written, the buffer memory PSP forwards the accepted message packets to the serving line A connected to the respective evaluation unit AWE, whereby it effects a matching of the transmission speed prevailing within the message packet switching equipment PVE to the transmission speed on the respective serving line A that is lower in comparison thereto.

During this forwarding process, the message packets pass through a converter CONV in which the auxiliary identifier attached to the message packets in the handling device BHE of the input side is removed.

Ambiguities between message packets having identical sequence numbers in respective successive message packet cycles can be avoided in that, foregoing a faulty message packet, the following, intermediately-stored message packets are forwarded to the appertaining serving line A no longer than the following of a duration that corresponds to the minimum transmission duration of a message packet cycle. A monitoring of the dwell time of the intermediately-stored message packets in the respective intermediate memory is SP1, ZSP2 can occur, for example, in that, together with the sequence number of the respective, faulty message packet, the counter is set to via that corresponds to the number of message packets that are contained in a message packet cycle, whereby the counter is decremented in the clock that corresponds to the maximum message packet repetition rate and the reading of the intermediately-stored message packets from the respective intermediate memory ZSP1, ZSP2 is effected when the minimum counter reading is reached.

The intermediate memories ZSP can accept respective message packets from different virtual connections. A different switching matrix KV can be the respective fastest switching matrix KV for different virtual connections. In the exemplary embodiment of FIG. 2, an intermediate memory ZSP is provided for each switching matrix KV.

However, it should be expressly mentioned here that the buffer memory PSP can be designed such that, when the intermediate memories ZSP1, ZSP2 are omitted, the message packets are written into the buffer memory PSP in the sequence with which they are to be forwarded onto the appertaining serving line A. When a message packet is thereby missing, then this message packet is awaited for most of the time that corresponds to the minimum transmission duration of a message packet cycle to see whether it is transmitted by a respective slower switching matrix KV, whereby the respective missing message packet that was transmitted in time is immediately forwarded to the appertaining serving line A and the message packets intermediately stored in the buffer memory PSP are forwarded to the appertaining serving line A in the shortest possible succession. Since the message packets that precede a missing message packet in the sequence can already be transmitted, a number of memory locations that corresponds to the plurality of message packets contained in a message packet cycle suffices for the buffer memory PSP in this embodiment.

Finally, it should also be mentioned that the intermediate memories ZSP or, respectively, the buffer memory PSP can be administered by a waiting line (register file) that is connected in parallel to the actual memory. The memory locations occupied by the respective virtual connections are then identified in the register file. When the message packet missing for a respective virtual connection is forwarded, then the intermediately-stored message packets belonging to this virtual connection are each respectively additionally identified by setting a marker bit, whereupon the message packets identified in this manner are forwarded in the shortest possible sequence to the appertaining serving line A with the message packet that was intermediately stored for the longest time interval.

Although we have described our invention by reference to particular illustration embodiments thereof, many changes and modifications of the invention may become apparent to those skilled in the art without departing from the spirit and scope of the invention. We therefore intend to include within the patent warranted hereon, all such changes and modifications as may reasonably and properly be included within the scope of our contribution to the art.

We claim:

1. In a method for forwarding message packets that are transmitted according to an asynchronous transfer mode on offering lines, during the course of virtual connections onto serving lines, in which the message packets each comprise a packet header identifying a respective virtual connection to a serving line, in which a packet switching equipment is connected between the offering lines and the serving lines and comprises at least two redundant switching matrices, in which a message packet group is formed by multiplication of each message packet received on an offering line during the course of a virtual connection, in which message packet groups are formed by attaching an identical identifier to each message packet of a message packet group and is changed from message packet group-to-message packet group, in which the message packets of each message packet group are separately transmitted via the redundant switching matrices towards the serving line identified on the basis of the virtual connection identification, in which, after the simultaneous transmission of the message packets of a message packet group via the redundant switching matrices, an improvement comprises:

checking a message packet for transmission faults after transmission of said message packet over a respective one of said redundant switching matrices;

forwarding only a first fault-free transmitted message packet of a respective message packet group;

buffering message packets which follow a faulty-transmitted message packet and which belong to the same virtual connection as the faulty-transmitted message packet until a fault-free transmitted message packet transmitted via a respective slower switching matrix and that belongs to the same message packet group as the faulty-transmitted message packet has been forwarded; and then, forwarding the buffered message packets in rapid sequence.

2. The method of claim 1, wherein a defined plurality of message packets form a message packet cycle, and further defined by:

forwarding each intermediately-stored message packet no later than a time interval which corresponds to the shortest possible transmission duration of a message packet cycle.

3. In a circuit arrangement for forwarding message packets according to an asynchronous transfer mode and received on offering lines during the course of virtual connections, and of the type in which a packet switching equipment comprising at least two redundant switching matrices is connected by way of respective handling devices therein to the offering lines and by way of a plurality of evaluation devices therein, respectively, to a corresponding plurality of serving lines, in which each handling device attaches an auxiliary identifier to each message packet received and forms message packet groups of identical message packets which, in number, corresponds to the number of redundant switching matrices, in which the auxiliary identifier is changed from message packet group-to-message packet group, in which each evaluation device receives message packets transmitted via the redundant switching matrices and is responsive to the auxiliary identifiers assigned by the handling devices to forward only one of the message packets of a message packet group to the respective serving line, the improvement therein comprising:

means in each of said evaluation devices for evaluating message packets for faulty transmission;

means in each of said evaluation devices for forwarding only a first faultfree transmitted message packet of a respective message packet group;

memory means for buffering message packets which follow a faulty-transmitted message packet of said message packet group and that belong to the same virtual connection as an expected next message packet;

means for forwarding to the respective serving line a message packet transmitted via a respective slower one of the redundant switching matrices and belonging to the same message packet group as the faulty-transmitted message packet; and means for reading from said memory means and forwarding message packets stored in said memory means to the respective serving line in the same sequence in which they were deposited in said memory means.

4. The improved circuit arrangement of claim 3, wherein a plurality of successive message packets form a message packet cycle, and said means for reading is further defined as:

means for reading each stored message packet from said memory means and forwarding the same no later than a time interval corresponding to the shortest possible transmission duration of a message packet cycle.

* * * * *